Feb. 16, 1960     H. R. G. DUNHAM     2,925,101
PAINT COMPONENT PROPORTIONING DEVICE
Filed Feb. 26, 1958     2 Sheets-Sheet 1
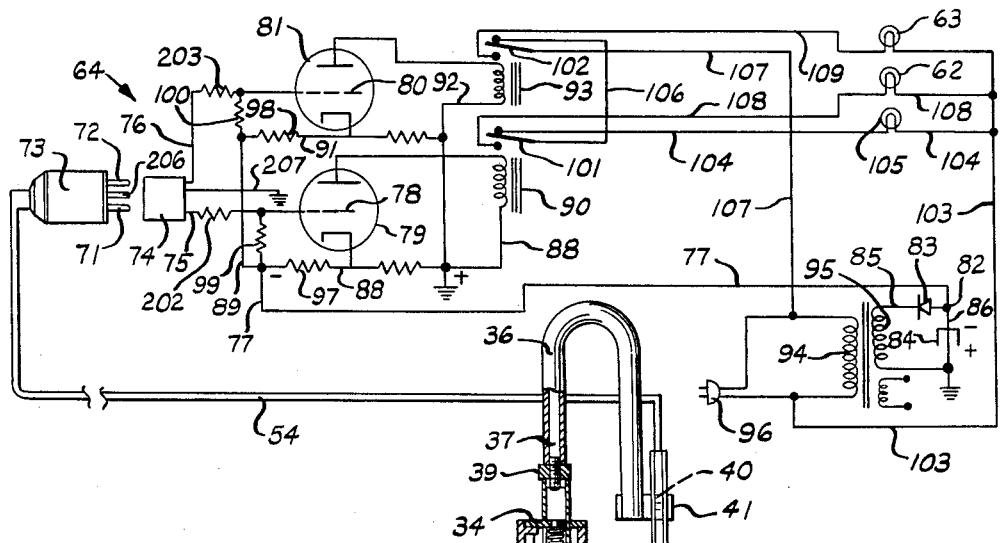
FIG. 1
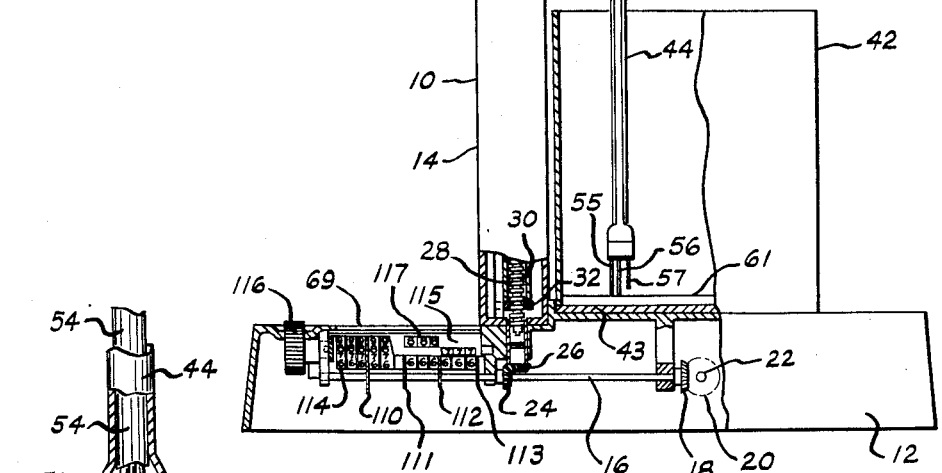
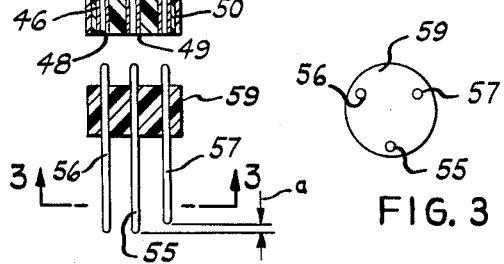
FIG. 2
FIG. 3
INVENTOR.
HOMER ROLAND GATES DUNHAM
BY
WILSON, LEWIS & McRAE
ATTORNEYS

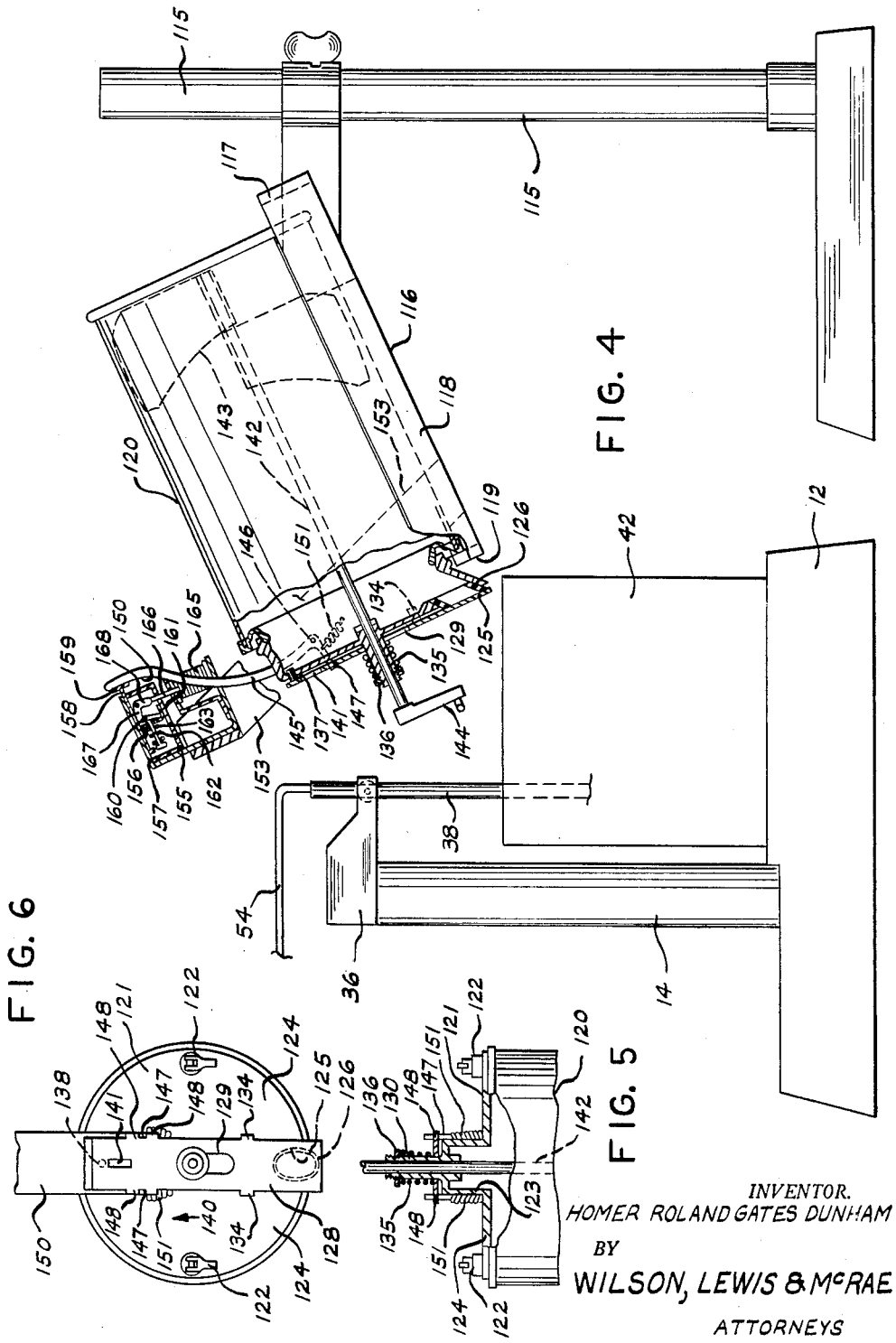

United States Patent Office 2,925,101
Patented Feb. 16, 1960

2,925,101

PAINT COMPONENT PROPORTIONING DEVICE

Homer Roland Gates Dunham, Dearborn, Mich., assignor to Rinshed-Mason Company, Detroit, Mich., a corporation of Michigan Application February 26, 1958, Serial No. 717,655

18 Claims. (Cl. 141—95)

This invention relates to a paint mixing apparatus, and particularly to an apparatus which can be employed to quickly mix a number of different base colors in varying proportions so as to obtain an infinite number of different shades.

The invention has particular use in automobile bump shops where the shop may be required to provide upwards of five thousand different colors for the various different makes and years of automobiles being refinished. With such a demand for different colors it is impractical to store each color on the shop shelves. Instead there has been devised a system wherein each job shop stores approximately seventy different base colors on its shelves; by mixing selected ones of these base colors in varying proportions it is possible to prepare any of the required five thousand shades.

In order to mix the base colors in exactly the proper amounts there has previously been devised a mixing apparatus which incorporates a raisable and lowerable probe element. The apparatus is equipped with a mechanical recording or "counting" mechanism for visually indicating the exact position of the probe element. In use of the apparatus the operator positions an empty cylindrical receptacle beneath the probe element and lowers the probe element to a desired position extending within the receptacle (as indicated by the recording mechanism). The operator then manually pours a base color into the receptacle until the liquid surface in the receptacle contacts the lower end of the probe element. When the contact is made a definite meniscus is formed at the probe element. The operator, by peering into the receptacle, can visually observe this meniscus to determine that the desired quantity of base color has been added to the receptacle.

The usual paint formula incorporates approximately five base colors, and the process of setting the probe element and pouring the base color is repeated approximately five times for an average formula.

The above described apparatus has generally met with widespread use and acceptance. However, in using the apparatus the operator must continuously peer into the receptacle in order to ascertain when the liquid level is approaching the probe element. When his eye tells him that the liquid level is approaching the probe element the operator must decrease the rate of pouring so as not to pour more than the desired quantity into the receptacle. In actual practice the liquid is poured from a closed container having a pouring spout closed by a spring urged valve member. To pour small amounts from the container the operator cracks the valve member open for small time intervals until the meniscus is formed at the probe element.

The present invention has among its objects the provision of a mixing apparatus which overcomes many of the problems associated with the previously discussed apparatus, namely the provision of a new and novel apparatus wherein:

(1) the operator need not peer into the receptacle in order to ascertain when the liquid level is approaching or contacting the probe element.

(2) the apparatus is provided with a number of "warning" probes which caution the operator to decrease his rate of pouring before the end point is reached, thereby enabling him to initially pour at a faster rate with the assurance that he will not inadvertently pour too much liquid into the receptacle.

(3) the probes are electrically interconnected with external easily viewable signalling devices located remote from the receptacle, thereby enabling the operator to have a clear indication of the signal as soon as the warning points and end points are reached.

(4) the apparatus in one form incorporates automatic mechanism for halting the pouring, either at the warning point or end point, thereby eliminating any inaccuracies or time delays due to human error.

Other objects of this invention will appear in the following description and appended claims, reference being had to the accompanying drawings forming a part of this specification wherein like reference characters designate corresponding parts in the several views.

In the drawings:

Fig. 1 is a sectional view through one embodiment of the invention, with electrical mechanisms employed therein being shown diagrammatically, Fig. 2 is an enlarged sectional view through the lower end portions of three probe elements employed in the Fig. 1 embodiment, Fig. 3 is a sectional view on line 3—3 in Fig. 2, Fig. 4 is an elevational view, with parts in section, of a second mechanism constructed according to the invention, Fig. 5 is an elevational view of a container closure employed in the Fig. 4 embodiment, and Fig. 6 is a top plan view of the Fig. 5 closure.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the Fig. 1 embodiment there is shown a measuring apparatus 10 comprised of a hollow base portion 12 and upstanding post structure 14.

Rotatably positioned within base portion 12 is a shaft 16 which carries a bevel gear 18 in mesh with bevel gear 20 carried by shaft 22. An external crank handle on shaft 22 is manually actuable to effect simultaneous rotation of the two shafts.

Shaft 16 carries a bevel gear 24, which meshes with a bevel gear 26 carried on the lower end of upstanding screw 28. Surrounding screw 28 is a sleeve 30, which carries a nut 32 in mesh with the screw. The upper end of the screw is rotatably journaled in a bracket 34 extending through an elongated slot in sleeve 30. The upper end of sleeve 30 is secured to a U-shaped tubular head element 36 by means of a stud 37 and knurled lock nut 39. Element 36 carries an arm 41 which serves to adjustably suspend a probe element assembly 38. A set screw 40 retains the probe element assembly in its adjusted positions.

In operation, manual rotation of shaft 22 causes screw 28 to be rotated so as to effect vertical movement of nut 32 and sleeve 30. As a result the probe element assembly 38 is caused to be moved vertically to selected positions in accordance with the quantities of paint to be added into receptacle 42 to produce a given paint formula. The U-shaped configuration of element 36 provides sufficient clearance space to accommodate relatively tall large volume receptacles 42 if desired.

The sequence of operations is such that probe element assembly 38 is initially lowered into receptacle 42 until the ends of probe elements 55 and 56 are spaced a predetermined distance above receptacle bottom wall 43. Organic solvent of suitable electrical conductivity is then poured into the receptacle until the surface of liquid 61 reaches probe elements 55 and 56, whereupon an electrical circuit is completed across the liquid between elements 55 and 56 for illuminating "warning" lamp 62. The operator is thereby cautioned to decrease his rate of pouring liquid into the receptacle. When the liquid level 61 reaches probe element 57 a circuit is completed across the liquid between elements 56 and 57 for illuminating "end point" lamp 63. The operator then rotates shaft 22 to raise probe element assembly 38 a predetermined amount, after which a base color is poured into the receptacle until lamps 62 and 63 are sequentially illuminated. The process is repeated for each base color addition.

Referring to Fig. 2, probe element assembly 38 comprises a rigid sleeve 44 having a lower flared out end portion 45 in which is secured a block of dielectric material 46. Three metal socket members 48, 49 and 50 are secured in block 46 to electrically connect with insulated conductors 51, 52 and 53. A covering 54 bundles conductors 51, 52 and 53 together in sleeve 44. Conductor 51 is grounded to sleeve 44 by means of a short conductor 205.

Socket members 48, 49 and 50 are adapted to frictionally seat three metal probe element pins 55, 56 and 57, which are embedded in dielectric block 59. It will be noted that the lower end of pin 57 terminates above the lower ends of pins 55 and 56 by a distance $a$. As a result, when liquid is being poured into receptacle 42 it will raise the liquid surface 61 into contact with pins 55 and 56 before contact with pin 57. Accordingly, pins 55 and 56 act as "warning" probe elements, and pin 57 acts as an "end point" probe element. The purpose in making probe elements 55, 56 and 57 separable from conductors 51, 52 and 53 is to permit interchangeable use of probe elements having different spacings $a$. In this manner the time interval between the "warning" signal and the "end point" signal may be varied to suit individual preferences. The spacing between the levels of the probe element ends can also be varied by making the probe elements extensible, if desired.

In order to visually indicate when liquid surface 61 makes contact with the probe elements there is provided the electrical circuitry indicated generally by numeral 64. Preferably this circuitry is housed on a chassis within a single relatively small portable casing having a height of about five or six inches. The casing may be placed in the vicinity of measuring apparatus 10 so as to be easily viewable by the operator as he pours paint into receptacle 42.

Probe element conductors 51, 52 and 53 extend within covering 54 into electrical connection with respective ones of conventional prong elements 206, 71 and 72 carried by dielectric plug member 73. Fixed socket member 74 releasably connects the prong elements with respective ones of lines 207, 75 and 76.

Two electronic control devices (in the form of vacuum tubes) are shown at 79 and 81. Line 75 connects with grid 78 of vacuum tube 79, and line 76 connects with grid 80 of vacuum tube 81. A line 77 extends from line 75 to a juncture 82 with lines 85 and 86. A selenium rectifier 83 is provided in line 85, and a condenser 84 is provided in line 86. Line 77 connects with lines 88 and 89. Line 88 leads to the coils of relay 90, and line 89 leads through lines 91 and 92 to the coils of relay 93.

In order to supply the relay coils with current there is provided a transformer having a primary 94 and secondary 95. In operation, conventional plug 96 is inserted into a conventional 110 to 120 volt alternating current power line to feed the primary with current. With plug 96 connected and probe elements 55, 56 and 57 free of any contact with liquid in receptacle 42 the grids of tubes 79 and 81 are at negative potential (bias) in respect to their cathodes due to the current flowing through and voltage drop across cathode resistors 97 and 98. The grids are connected through very high resistances 99 and 100 to common negative. In this condition low plate current is flowing through relay coils 90 and 93 insufficient to pull in the relay armatures. Consequently the relay contact arms 101 and 102 will be in the Fig. 1 positions.

In the illustrated positions of arms 101 and 102 a circuit is established through lines 103 and 104, lamp 105, switch arm 101, line 106, switch arm 102, and line 107. A green tinted glass is preferably provided in front of lamp 105 to indicate "all clear to pour" in the manner of a conventional "go" signal lamp in a highway traffic light.

When probe elements 55 and 56 contact liquid 61 a circuit is established from secondary 95 through lines 85 and 77, resistor 99, line 75, resistor 202, prong 71, conductor 52, probe element 55, liquid 61, probe element 56, conductor 51 and grounded sleeve 44. Probe 56 is grounded to the chassis for circuitry 64 through line 51, prong 206 and line 207; as a result probe 56 is at plus potential with respect to the negatively biased grids of tubes 79 and 81. Because of the conductivity of liquid 61 (which can have a very high resistance in the neighborhood of 100 megohms) probe element 55, conductor 52, prong 71 and grid 78 assume a higher positive potential than formerly. At this higher potential tube 79 passes higher plate current through the coil of relay 90 to cause switch arm 101 to connect with line 108. A circuit is thereby established through lines 103 and 108, lamp 62, switch arm 101, line 106, arm 102, and line 107. A yellow tinted glass plate is preferably provided in front of lamp 62 to indicate a "warning" in the manner of a conventional yellow traffic signal light.

When probe element 57 contacts liquid 61 a circuit is established from probe element 56 across liquid 61 through element 57, conductor 53, prong 72 and line 76 so as to establish a more positive grid potential at 80. As a result current flow through tube 81 is increased so as to pull in the armature of relay 93 and move switch arm 102 to a position connecting lines 107 and 109. A circuit is thereby completed from line 103 through lines 107 and 109, lamp 63, arm 102, and line 107. A red tinted glass is preferably provided in front of lamp 63 to indicate a "stop" point in the manner of a conventional traffic stop light.

By way of summary, when none of the probe elements are in contact with liquid surface 61 only green "go" light 105 is illuminated. When only the two probe elements 55 and 56 are in contact with liquid surface 61 only yellow "warning" light 62 is illuminated. When the three probe elements 55, 56 and 57 are in contact with liquid 61 only the red "stop" light 63 is illuminated.

In order to accurately set probe element assembly 38 at desired elevations within receptacle 42 there is provided a counting or recording mechanism 69 geared at 110, 111, 112 and 113 to shaft 16. Mechanism 69 includes four sets of numbered wheels 114, with three wheels in each set. The set of wheels controlled by gearing 110 is used when receptacle 42 is "one pint" size, the set of wheels controlled by gearing 111 is used when receptacle 42 is "one quart" size, the set of wheels controlled by gearing 112 is used when receptacle 42 is "one-half gallon" size, and the set of wheels controlled by gearing 113 is used when receptacle 42 is "one gallon" size. A rotary shield 115 is provided for selectively concealing all but one set of the numbered wheels at any one position of the shield. Manual rotation of the shield by knob 116 causes a selected one of the four rectangular apertures in shield 115 to overlie the set of wheels 114 corresponding to the size of the receptacle 42 positioned on support surface 118. Thus, if receptacle 42 is one gallon size knob 116 is manually rotated to position aperture 117 above the numbered wheels. As a result only the three numbered wheels controlled by gearing 112 will be displayed to view.

The rightmost wheel in each set of wheels is numbered from zero to nine to register a total of nine increments of movement of assembly 38. The center wheel in each set of wheels is numbered from zero to nine to register a total of ninety increments of movement of assembly 38. The left wheel in each set of wheels is numbered from zero to nine to register a total of nine hundred increments of movement of assembly 38. Each set of wheels thereby can be adjusted (by manual rotation of shaft 22) to indicate any one of a thousand different elevations of probe assembly 38.

Each of the previously mentioned paint formulas is calculated to total one thousand volumetric parts so as to permit use of the numbered wheels 114. Thus as a simplified illustration one paint formula might consist of 100 volumetric parts lacquer thinner, 228 volumetric parts yellow, and 672 volumetric parts blue.

In use of the Fig. 1 apparatus to prepare this paint formula, shaft 22 would be rotated until the particular numbered wheels (corresponding to the size of receptacle 42) registered 100 increments. Lacquer thinner would then be poured into the receptacle until stop light 63 was illuminated. Shaft 22 would again be rotated until the wheels registered 328 increments, after which yellow base color would be poured into the receptacle until stop light 63 was again illuminated. Finally shaft 22 would be rotated until the wheels registered 000 (with the probe elements elevated), after which blue base color would be poured into the receptacle until stop light 63 was again illuminated.

It will be noted that in operation of the Fig. 1 embodiment probe element 56 is electrically connected to and at the same electrical potential as the metal base 12. In the case where container 42 is of metal or electrically conductive construction liquid 61 will also be at the same potential, and element 56 may be eliminated.

In connection with operation of the Fig. 1 embodiment it should be understood that the probe circuitry is such that liquid 61 can have a comparatively high electrical resistance (i.e. in the neighborhood of 100 megohms) without imparing operability of the mechanism. This feature is of importance when it is realized that many of the organic solvents employed in the paint industry are of comparatively high electrical resistance.

It will be noted that resistors are provided at 202 and 203. These resistors are preferably one million ohms or better, preferably about 2.2 megohms, so as to effectively reduce the current flow in the probe circuit below 100 microamperes. This low current flow eliminates the possibility of electrical shock or ignition of explosive vapors.

The Fig. 4 embodiment incorporates the Fig. 1 probe element assembly and recording mechanism in combination with means for automatically halting the pouring of liquid into receptacle 42, either at the "warning" point or the "stopping" point. U-shaped head element 38 may be replaced with the Fig. 4 head element 38a in the event that it is not desired to utilize the tall, large size receptacles 42.

The Fig. 4 embodiment includes an upstanding post structure 115 which supports a cradle structure 116. The cradle structure includes a web bar section 117, two parallel bar sections 118, and inturned end flange sections 119, the arrangement being such that a cylindrical paint container 120 may be removably placed on the cradle structure in position to discharge its contents into receptacle 42.

Container 120 is provided with a cover 121 having suitable clamps 122 for releasably retaining it on the container. The central portion 123 of cover 121 is raised upwardly from end portions 124 to form an opening 125 in which is fixedly secured an annular spout member 126 formed of polyethylene, polytrifluorochloroethylene, or similar plastic material which is of a "non-wetting" nature. Employment of such plastic material for the spout is advantageous because paint tends to flow from the spout down into container 120 after the container has been returned to an upright position on the user's shelf; as a result the spout is kept free of sticky or hardened paint such as would tend to prevent full closing of slidable valve member 128.

Valve member 128 is a flat plate structure provided with an elongated slot 129. The valve member is positioned on cover 121 with upstanding tubular boss portion 130 projecting through slot 129 so as to aid in the slidable guiding of the valve member. To further guide the valve member in its slidable movement there are provided two valve member extensions 134 which slidably engage side surfaces of cover portion 123. Suitable frictional engagement is provided between the valve member and cover by means of a compression spring 135. A nut 136 is provided for adjusting the compressive force of the spring.

It will be noted that valve member 128 does not directly engage the upper face of cover section 123. Instead, valve member 128 has its opposite end sections engaged with plastic spout member 126 and flat faced plastic insert 137. This arrangement reduces frictional drag on the valve member and promotes a smooth sliding valve action.

Insert 137 is provided with a small opening 138 which acts as an air vent to promote discharge of paint from the container. The insert is preferably formed of the same "non-wetting" plastic material as spout 126. In order that the container will be completely sealed when it is stored on the user's shelf, air vent 138 is normally closed by the adjacent end section of member 128. However, when valve member 128 is moved from its closed position in the arrow 140 direction an elongated slot 141 is caused to register with opening 138. In this manner the container contents are sealed from the atmosphere when the container is stored, but the air vent 138 is opened when needed during the paint-pouring operation. Before the paint-pouring operation it may be necessary to stir the paint, and accordingly there is provided a stirring mechanism in the form of a shaft 142, agitator blades 143 and manually operable handle 144.

In order to operate valve member 128 there is provided a lever 145 having a pivotal connection with cover section 123 at 146. Lever 145 includes parallel arm sections 147, which extend through slots formed by extensions 148. In operation, the application of pressure on lever surface 150 is effective to move valve member 128 in the arrow 140 direction. Withdrawal of the pressure allows tension springs 151 to act on lever 145 to reverse the valve member movement. It will be noted that valve member 128 has a continuous sliding engagement on the exposed annular edge of spout 126. The sliding movement is substantially at right angles to the direction of liquid flow out of the spout so that member 128 is not unnecessarily halted by the liquid pressures. The arrangement is such that the valve member is capable of quick and complete closing by springs 151.

Extending upwardly from cradle 116 is an arm structure 153 which supports a small housing 155. Within housing 155 is a fixed partition 156 which cooperates with housing end wall 157 to slidably support an abutment plate 158. The outer end of plate 158 is turned upwardly to form a finger-engageable operating portion 159. In operation of the apparatus, container 120 is initially positioned in cradle 116 with abutment plate 158 in its illustrated "retracted" position; the valve member 128 is in a closed position without any pressure existing between abutment portion 159 and lever surface 150. Valve member 128 is opened by manually drawing plate 158 out of housing 155 so as to develop an operating force on lever surface 150. Reverse movement of plate 158 is prevented by brake plate 160 which is rockably mounted at 161. A compression spring 162 acts on pin 163 carried by plate 160 so as to urge plate 160 counterclockwise in a manner tending to wedge plate 160 against the lower face of plate 158. The wedging action is such as to prevent retractive movement of abutment plate 158 into housing 155.

Secured on housing 155 is a solenoid 165 having an armature 166 which is operatively connected to extensions 167 of plate 160 by means of a link 168. In operation of the apparatus, energization of solenoid 165 is effective to draw armature 166 downward so as to move brake plate 160 clockwise out of "wedged" engagement with abutment plate 158. The abutment plate is thereby freed for retractive movement into housing 155 under the influence of springs 151.

Solenoid 165 may be substituted for or connected in parallel with lamp 62 or lamp 63 in the Fig. 1 circuitry.

When solenoid 165 is substituted for or connected in parallel with lamp 62 it will of course be energized as a warning "flow cut off" device. Further pouring of liquid into receptacle 42 after energization of solenoid 165 is performed by application of manual pressure on lever surface 150 until lamp 63 is illuminated.

When solenoid 165 is substituted for or connected in parallel with lamp 63 it will be utilized as an end point "flow cut off" device. In this case abutment member 159 is initially manually forced against lever 145 to obtain a very small paint stream from spout member 126. Lever 145 is then manually opened to permit a larger paint stream to flow. When the liquid level rises to contact probe elements 55 and 56 so as to illuminate warning lamp 62, lever 145 is manually released. Springs 151 thereby become effective to hold lever 145 against abutment member 158 in a manner permitting the paint to flow into receptacle 42 as a small stream (as determined by the setting of member 159). When the level of liquid 61 rises to contact probe element 57 solenoid 165 will be energized so as to cut off the paint flow. Since only a very small stream will be flowing when solenoid 165 is energized, the cut off point will be very accurate. At the same time the paint-adding process will be comparatively fast because of the large paint stream taking place until energization of lamp 62.

I claim:

1. The combination comprising a receptacle support; first and second electrical probe elements; means suspending said probe elements in positions above the receptacle support so as to be adapted to depend into a receptacle thereon; raising and lowering means for effecting relative vertical movement between the probe elements and the receptacle support to position the probe element lower ends at points adjacent the receptacle bottom or receptacle top; means for supplying current to one of the probe elements; and mechanism for recording the spacing between the receptacle support and the lower ends of the probe elements; whereby, when the probe elements are positioned at a desired level, as indicated by the recording mechanism, the receptacle may be filled with liquid until the liquid surface contacts the lower ends of the probe elements, after which a circuit is completed through the liquid between the probe elements.

2. The combination comprising a receptacle support; first, second and third electrical probe elements; means suspending said probe elements in positions above the receptacle support so as to be adapted to depend into a receptacle thereon; said suspending means positioning the third probe element with its lower end slightly above the lower ends of the first and second probe elements; raising and lowering means for effecting relative vertical movement between the probe elements and the receptacle support; mechanism connected with the raising and lowering means for recording the spacing between the receptacle support and the lower ends of the probe elements; and means for supplying current to the second probe element; whereby, when the probe elements are positioned at a desired level, as indicated by the recording mechanism, the receptacle may be filled with liquid until the liquid surface contacts the lower ends of the first and second probe elements to complete a first circuit through the liquid between said first and second probe elements, after which the receptacle may be filled further until the liquid surface contacts the lower end of the third probe element to complete a second circuit through the liquid between the first and third probe elements.

3. The combination of claim 1 wherein said suspending means comprises a rigid vertical tube having a conductor therein for each of the probe elements, and a dielectric element carrying the probe elements at the lower end of the tube in removable electrical connection with the conductors; whereby the relative positions of the second and third probe elements may be varied by replacement of the dielectric element-probe element assembly on the lower end of the suspending tube.

4. The combination comprising a receptacle support; first and second electrical probe elements; means suspending said probe elements in positions above the receptacle support so as to be adapted to depend into a receptacle thereon; said suspending means positioning the second probe element with its lower end slightly above the lower end of the first probe element; a relatively high current "pour warning" circuit; a first relatively high current "pour end point" circuit; a first relay operated by low current for energizing the warning circuit; a second relay operated by low current for energizing the end point circuit; a first relatively low current circuit including the first probe element and a first electronic control device for actuating the first relay; and a second relatively low current circuit including the second probe element and a second electronic control device for actuating the second relay; whereby the receptacle may be filled with liquid until the liquid surface contacts the lower end of the first probe element to complete the first low current circuit through the liquid, after which the receptacle may be filled further until the liquid surface contacts the lower end of the second probe element to complete the second low current circuit through the liquid; the arrangement being such that any explosive vapors adjacent the liquid are prevented from being ignited during current flow through the probe elements.

5. The combination comprising a receptacle support; first and second electrical probe elements; means suspending said probe elements in positions above the receptacle support so as to be adapted to depend into a receptacle thereon; raising and lowering means for effecting relative vertical movement between the probe elements and the receptacle support; mechanism for recording the spacing between the receptacle support and probe elements; a container carrier removably suspending a liquid container in position above the receptacle support for discharge of its contents into the receptacle; a valve means movably mounted on the container for interrupting the discharge of liquid therefrom; electrically-operated means for controlling the valve means; and electric circuitry between the probe elements and electrically-operated means; whereby, when the probe elements are positioned at a desired level, as indicated by the recording mechanism, the receptacle may be filled with liquid from the container until the liquid surface in the receptacle contacts the lower ends of the probe elements, after which a circuit is completed through the liquid between the probe elements to cause energization of the electrically-operated means and consequent movement of the valve means to a closed position interrupting liquid discharge from the container.

6. The combination comprising a receptacle support; first and second electrical probe elements; means suspending said probe elements in positions above the receptacle support so as to be adapted to depend into a receptacle thereon; a container carrier removably suspending a liquid container in position above the receptacle support for discharge of its contents into the receptacle; valve means movably mounted on the container for interrupting the discharge of liquid therefrom; electrically-operated means for controlling the valve means; and electric circuitry between the probe elements and electrically-operated means; whereby the receptacle may be filled with liquid from the container until the liquid surface in the receptacle contacts the lower ends of the probe elements, after which a circuit is completed through the liquid between the probe elements to cause energization of the electrically-operated means and consequent movement of the valve means to a closed position interrupting liquid discharge from the container.

7. The combination comprising a receptacle support; first and second electrical probe elements; means suspending said probe elements in positions above the receptacle support so as to be adapted to depend into a receptacle thereon; a container carrier removably suspending a liquid container in position above the receptacle support for discharge of its contents into the receptacle; said container including a can section and a cover section removably locked together; a liquid discharge spout formed in the cover section and having a flat annular edge portion defining the spout opening; a flat-surfaced valve member mounted for slidable movement on and across said annular edge portion to control liquid discharge from the container without allowing any liquid to collect on said edge portion; electrically-operated means for closing the valve member; and electric circuitry between the probe elements and electrically operated means; whereby the receptacle may be filled with liquid from the container until the liquid surface in the receptacle contacts the lower ends of the probe elements, after which a circuit is completed through the liquid between the probe elements to cause energization of the electrically-operated means and consequent movement of the valve member to a closed position interrupting liquid discharge from the container.

8. The combination of claim 7 wherein the spout is formed by an annular element secured in the cover section, said annular element being constructed of a non-wetting plastic material to prevent liquid within the container from clogging the spout to as to interfere with full closing of the valve member.

9. The combination of claim 8 wherein the plastic material is polyethylene.

10. The combination of claim 8 wherein the plastic material is polytrifluorochloroethylene.

11. The combination of claim 7 and further comprising a vent opening formed in a portion of the cover section shielded by the valve member when said valve member is in a closed position; said valve member having a slot offset slightly from the vent opening, whereby during opening movement of the valve member the slot is caused to register with the vent opening for facilitating the discharge of liquid from the spout.

12. The combination of claim 11 wherein the vent opening is formed by a non-wetting plastic element secured in the cover section.

13. The combination of claim 12 wherein the spout and plastic element project from the external face of the cover section, with said valve member slidably engaging said spout and plastic element to the exclusion of said external face, thereby promoting a smooth sliding valve member movement.

14. The combination of claim 7 and further comprising spring means carried by the cover section in pressure engagement with the valve member for applying a predetermined drag force on the valve member at right angles to the direction of its movement so as to promote a smooth sliding movement.

15. The combination comprising a receptacle support; first and second electrical probe elements; means suspending said probe elements in positions above the receptacle support so as to be adapted to depend into a receptacle thereon; a container carrier removably suspending a liquid container in position above the receptacle support for discharge of its contents into the receptacle; valve means movably mounted on the container for interrupting the discharge of liquid therefrom; spring-operated structure carried by the container for moving the valve means to a closed position; abutment means movably carried by the container support in the path of movement of the spring-operated structure during its valve-closing movement; brake mechanism engageable with the abutment means to releasably hold it in the path of the spring-operated structure; electrically-operated power means for moving the brake means out of holding engagement with the abutment means; and electric circuitry between the probe elements and power means; whereby, the receptacle may be filled with liquid from the container until the liquid surface in the receptacle contacts the lower ends of the probe elements, after which a circuit is completed through the liquid to cause energization of the power means for allowing the spring-operated structure to close the valve means and thereby halt liquid discharge from the container.

16. The combination of claim 15 wherein the abutment means comprises a slidable plate; said brake means including a pivotally mounted arm having a path of movement crossing said slidable plate, and spring means urging the arm into frictional engagement with said plate; said power means comprising a solenoid and cooperating armature connected with the arm; whereby energization of the solenoid is effective to pivot the arm away from the slidable plate.

17. The combination comprising a liquid receptacle support; first and second electrical probe elements; means suspending said probe elements in positions above the receptacle support so as to be adapted to depend into a receptacle thereon; first and second relays; a control circuit including the first probe element and receptacle liquid for supplying current to said first relay; a control circuit including the second probe element and receptacle liquid for supplying current to said second relay; first and second electrically energizable signal devices; first switch means actuated by the first relay for energizing the first signal device; and second switch means actuated by the second relay for energizing the second signal device, the lower ends of the second probe element being spaced slightly above the lower end of the first probe element so that the signal devices are energized at different liquid levels, said first signal device serving as a warning and said second signal device serving as an end point.

18. The combination comprising a receptacle support; first, second and third electrical probe elements; means suspending said probe elements in positions above the receptacle support so as to be adapted to depend into a receptacle thereon; said suspending means positioning the third probe element with its lower end slightly above the lower ends of the first and second probe elements; first and second relays; a control circuit including the first and second probe elements for supplying current to the first relay; a control circuit including the first and third probe elements for supplying current to the second relay; first, second and third electrically-energizable signal devices; a current supply line for said first signal device closed during de-energization of both relays; a current supply line for said second signal device closed by operation of one relay only; and a current supply line for said third signal device closed by operation of both relays.

References Cited in the file of this patent
UNITED STATES PATENTS 2,081,651    Tamminga et al.    May 25, 1937
2,319,075    McKinnis    May 11, 1943